J. T. SCHAAFF.
ALTERNATING CURRENT ELECTRIC MOTOR.
APPLICATION FILED MAR. 9, 1906.
939,331.
Patented Nov. 9, 1909.
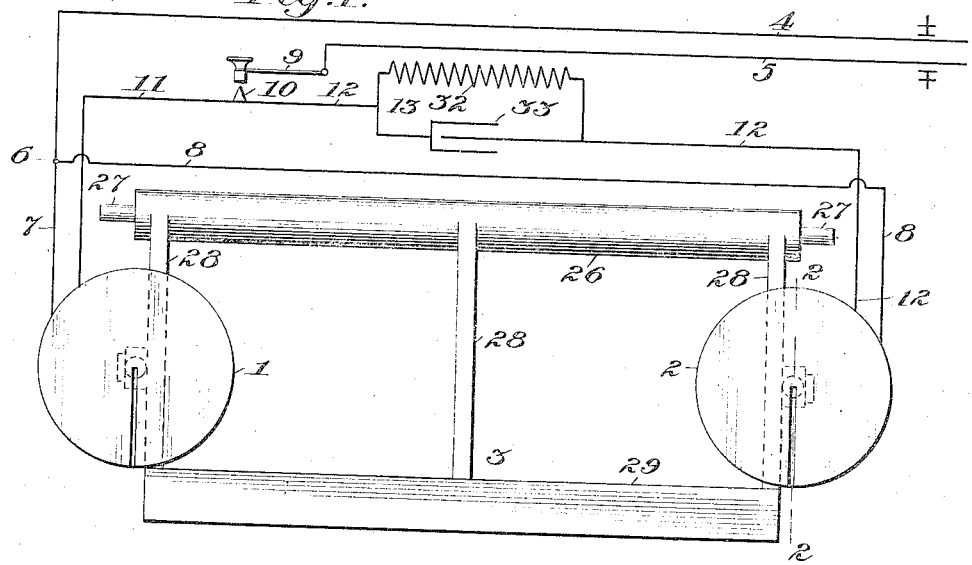
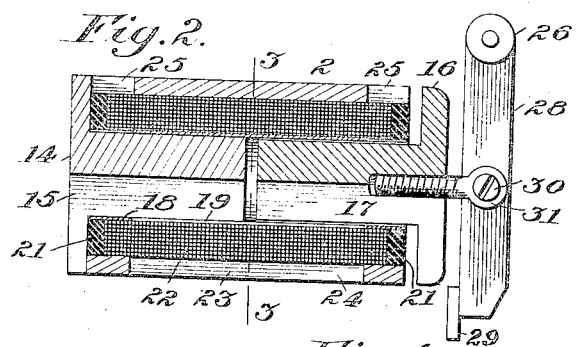
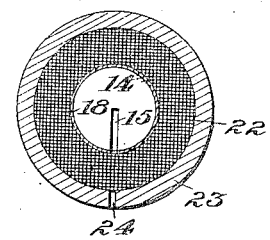
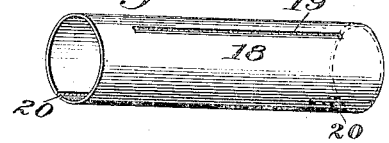
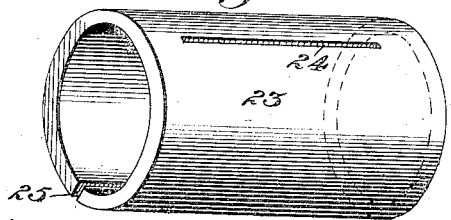
Witnesses:
Inventor:
John T. Schaaff,
by Byrnes & Townsend,
Att'ys.

UNITED STATES PATENT OFFICE.

JOHN T. SCHAAFF, OF WASHINGTON, DISTRICT OF COLUMBIA.

ALTERNATING-CURRENT ELECTRIC MOTOR.

939,331.   Specification of Letters Patent.   Patented Nov. 9, 1909.

Application filed March 9, 1906. Serial No. 305,090.

*To all whom it may concern:*

Be it known that I, JOHN T. SCHAAFF, a citizen of the United States, residing at Washington, in the District of Columbia, have invented certain new and useful Improvements in Alternating-Current Electric Motors, of which the following is a specification.

This motor comprises a plurality of electromagnets having movable armatures, a reciprocable member connected to the armatures, and means for retarding the phase of the current delivered to one magnet. The phase-difference between the two magnets is preferably about ninety degrees, so that the magnets are energized successively at such intervals that at least one armature is attracted with sufficient force to effectively operate the reciprocating driven member whenever the circuit is closed, whatever the phase of the current in the supply-wires at the moment of closing.

Referring to the accompanying drawings, Figure 1 is a plan view of the motor, the wiring, key and phase-retarder being shown diagrammatically; Fig. 2 is an axial section of one of the magnets on the line 2—2 of Fig. 1; Fig. 3 is a transverse section of a magnet on the line 3—3 of Fig. 2; Fig. 4 is a perspective view of the metal tube on which the magnet-wire is wound; and Fig. 5 is a perspective view of the iron sleeve of a magnet.

The magnets 1, 2, are arranged with their axes parallel, their movable armatures being pivotally connected to an oscillating frame 3. Alternating current is supplied by the line-wires 4, 5, the wire 6 having branches 7, 8, which lead to one end of the winding of the two magnets. The supply-wire 5 is connected to a switch or key-lever 9 which makes contact with a point 10, from which wires 11, 12 lead to the other ends of the magnet-windings. A phase-retarder 13 is interposed in the circuit 12.

Each electromagnet comprises a soft-iron core 14 which is radially slotted, in a plane 15, to its axis, and a movable armature 16 which is also radially slotted in a plane 17 to its axis. Upon the core 14 is supported a thin brass tube 18 which is longitudinally slotted along diametrically opposite lines 19, 20. The slot 19 extends nearly to the ends of the tube and two slots 20 extend inward from the ends of the tube. These slots substantially prevent the circulation of eddy-currents in the tube, while the uncut portions prevent the tube from collapsing under the pressure of the winding. Upon the ends of the tube 18 are mounted insulating disks 21, between which is the wire winding 22. An iron sleeve 23, having longitudinal slots 24, 25 corresponding to those in the brass tube and for the same purpose, surrounds the winding 22 and is in contact at one end with the flange of the core 14, the other end being opposed to the flanged end of the armature 16.

The oscillating frame 3 comprises a rock-shaft 26 having journals 27, parallel lateral arms 28 and a cross-piece 29. To each of the outer arms 28 is pivoted, by a screw 30, a link 31 which is adjustably threaded into an axial bore in a magnet-armature.

The phase retarder 13 may be of any usual or preferred construction. That shown comprises an inductance 32 in the form of a coreless solenoid, and a condenser 33 parallel thereto. These elements are preferably proportioned to cause the phase of the current supplied to the magnet 2 to lag about ninety degrees behind that supplied to the magnet 1, the result being that current at substantially the full line pressure is always supplied to one of the magnets when the key 9 is closed, whatever the phase of the current in the line wires.

Motors of this construction may be used on three or other polyphase-current circuits, the number of electromagnets then corresponding to the number of phases and each magnet but one being supplied with a suitable phase-retarder, so that the several magnets are energized in succession. The armatures of the magnets may be rigidly connected together, or be parts of a single member, for example a bar, which may itself constitute the reciprocable member of the motor, it being immaterial whether the reciprocation of the driven member is in a right line or an arc.

The motor is applicable to a variety of uses, such as the actuating of cash registers, adding machines, typewriting machines and punches for preparing the paper stencils for typesetting machines.

I claim:—

1. An alternating-current electric motor, comprising a plurality of separate electromagnets, spaced apart, a single armature member reciprocable in the same direction by both magnets, a source of alternating electric current connected to both magnets, and a phase-retarder in the circuit of one magnet.

2. An alternating-current electric motor, comprising a plurality of separate electromagnets, spaced apart, each electromagnet comprising a slotted core and armature, a single armature member reciprocable in the same direction by both magnets, a source of alternating electric current connected to both magnets, and a phase-retarder in the circuit of one magnet.

3. An alternating-current electric motor, comprising a plurality of separate electromagnets, spaced apart, each electromagnet comprising a slotted metal core, shell and armature, a single armature member reciprocable in the same direction by both magnets, a source of alternating electric current connected to both magnets, and a phase-retarder in the circuit of one magnet.

4. An alternating-current electric motor, comprising a plurality of separate electromagnets, spaced apart, each electromagnet comprising a tubular metal member slotted longitudinally at two points, a single armature member reciprocable in the same direction by both magnets, a source of alternating electric current connected to both magnets, and a phase-retarder in the circuit of one magnet.

In testimony whereof, I affix my signature in presence of two witnesses.

JOHN T. SCHAAFF

Witnesses:
C. W. FOWLER,
EUGENE A. BYRNES.